Oct. 13, 1936. L. I. HEWES Re. 20,129

HEAD LAMP

Original Filed March 19, 1931 2 Sheets-Sheet 1

Laurence I. Hewes INVENTOR

Oct. 13, 1936. L. I. HEWES Re. 20,129

HEAD LAMP

Original Filed March 19, 1931 2 Sheets-Sheet 2

Laurence I. Hewes INVENTOR

Reissued Oct. 13, 1936

Re. 20,129

UNITED STATES PATENT OFFICE 20,129

HEAD LAMP

Laurence I. Hewes, San Francisco, Calif.

Original No. 1,932,547, dated October 31, 1933, Serial No. 523,700, March 19, 1931. Application for reissue October 23, 1935, Serial No. 56,056

4 Claims. (Cl. 240—48.4)

This invention relates to lamps and more particularly to vehicle headlamps in which it is desirable that objectionable glare be reduced or eliminated. It is an object of this invention to provide an improved lamp in which the glare is materially reduced. Other objects and advantages of the invention will appear hereinafter.

A particularly illustrative embodiment of the invention selected merely for descriptive purposes is shown in the accompanying drawings forming a part hereof, and in which.

According to this invention a cylindrical shield is provided between the source of light and the lens for intercepting substantially all of the direct light rays which normally would reach the eyes of an observer approaching the lamp. The surface of the cylindrical shield is a surface which is traced by a right line moving parallel to a fixed right line, and a transverse section through such a shield may be circular, oval or polysided.

The cylindrical shield, preferably tubular and of a cross-section only slightly larger than that of the source of light, is positioned with its axis of symmetry substantially parallel to the majority of the reflected light rays, and preferably substantially coincident with the axis of the reflector. Since the shield is small in cross-section and has its axis substantially parallel to the reflected light rays it does not interfere materially with the reflected rays. The tubular shield preferably extends from a point adjacent the lens toward the source of light to or just through the limiting surface of the direct light ray cone defined by the lens. All direct light rays which normally would reach the eyes of an observer, except the small bundle of rays passing through the tubular shield, are intercepted by the shield, but there is no interference with the direct light rays passing to the reflector.

Ordinarily this small bundle of direct light rays through the tubular shield will be below the eyes of an observer approaching the vehicle and will not give rise in an objectionable glare. However, it may be desirable to apply a complete or partial closure to the outer or forward end of the cylindrical shield to intercept all or a part of the direct light rays within the cylindrical shield. A completely closed tubular shield would interfere with no reflected rays except the small beam of such rays along the axis of the shield itself, but would completely shield the motorist's eyes from any view whatever of the incandescent element, that is, from all direct light rays. Similarly, a tubular shield partially closed at the forward end would interrupt a still smaller fraction of reflected rays, while cutting off most of the direct rays from the view of the observer. Desirably the cylindrical shield permits the passage of direct light rays forwardly and downwardly on to the roadway, for example through a longitudinal slot in the lower side of the shield. With such a construction the lower portion of the outer end of the tubular shield ordinarily will not be closed, and if there is a closure across the upper portion of the shield it may take the form of an inclined reflector which will increase the illumination of the roadway.

Figure 1:
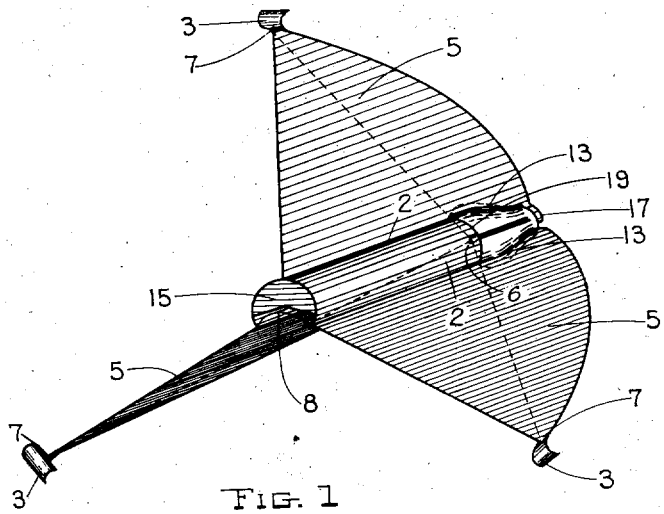
Fig. 1 is a perspective view of a device adapted for use with a paraboloidal reflector for reducing glare.
Figure 2:
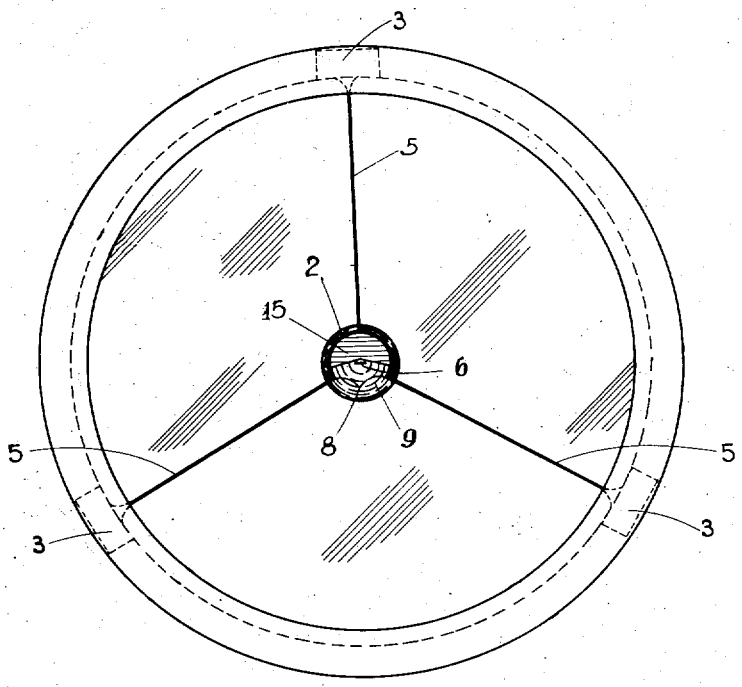
Fig. 2 is a front elevation of a headlamp equipped with the device of Fig. 1.
Figure 3:
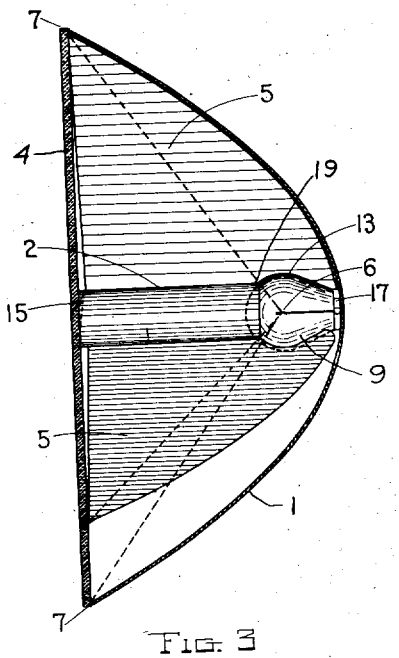
Fig. 3 is a side elevation of the device of Fig. 1, a reflector and lens being shown in cross section.

Referring to the drawings, and first to Fig. 3, a paraboloidal reflector 1 is provided adjacent its open end with a lens 4. Mounted within the reflector 1 is a lamp bulb 9 positioned with its incandescent element 6 approximately at the focus of the reflector. Extending from the lens 4 toward the lamp bulb 9 is a three leaved ruled surface shield 2. The shield 2 extends toward the source of light to or through the limiting surface of the conical pencil of direct light rays defined by the lens 4. These positions are shown in Figs. 1 and 3, wherein the three leaved ruled surface shield extends to the dotted lines 6—7 which indicate the limiting surface of the direct light ray cone. In the illustrative embodiment the ruled surface shield is partly circular in right section, and is cut away along its axis at 8, (Figs. 1 to 4) from which it opens downward so as not to interfere with the direct light rays transmitted forwardly and downwardly toward the roadway. The ruled surface shield 2 is positioned with its axis of symmetry substantially coincident with the axis of the paraboloidal reflector 1, and may extend into actual contact with the lamp bulb 9. If desired, the lamp bulb 9 may have a shoulder at the line of contact 19 with the shield to insure accurate adjustment.

As may best be seen in Figs. 1 and 2, the outer or forward end of the ruled surface shield 2 may be partly closed across its forward portion at 15, so that part of the direct and reflected light rays passing outwardly between the lower leaves of the shield are cut off from direct view. Preferably the closure 15 is inclined or curved, and desirably the inner surfaces of the shield 2 and of the closure 15 are reflecting surfaces so as to increase the reflected light which is directed on to the roadway.

Since objectionable glare may be caused by the random reflected light rays, that is, the reflected rays which are outside of the reflected parallel beam, a portion of the random reflected rays may be intercepted by subdividing the space between the reflector and the lens with light barriers, and if the barriers are ruled surfaces with their elements parallel to the axis of the reflector there will be substantially no interference by the barriers with the reflected parallel light beam. These barriers may, for example, take the form of thin flat leaves extending radially from the axis of the reflector to or toward the reflector surface.

Again referring to the drawings, extending radially outwardly from the axis of the shield 2 are three vanes, wings, or leaves 5 extending to or toward the surface of the paraboloidal reflector. These leaves are parallel to the axis of the reflector, and consequently do not interfere to any appreciable extent with the reflected parallel light beam. The leaves 5 are effective, however, to intercept random reflected light rays which are caused by the fact that the source of light is not a true point located exactly at the focus of the reflector.

The leaves 5 preferably are cut away as at 13 to accommodate the lamp bulb 9, and are provided with positive means such as an adjustable collar 17 for engaging the lamp bulb 9 or its base to help secure the shield 2 and leaves 5 in adjusted position within the reflector. The outer and forward edges of the leaves 5 preferably are provided with integral ears or extensions 3 which may be suitably secured to the forward edge of the reflector 1 or to the enclosing shell, (not shown) for holding the anti-glare device in position within the reflector. The vertical leaf 5 is preferably extended to close contact with the reflecting surface in order to provide for positive axial alignment of the shield.

Figure 4:
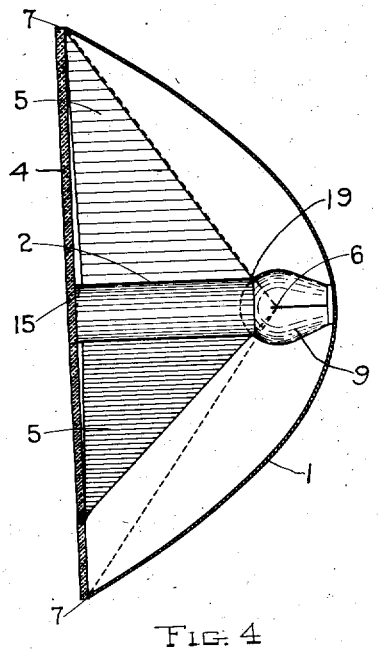
Fig. 4 is a view similar to Fig. 3, but of a slightly modified construction.

In the modification shown in Fig. 4 the leaves 5 which extend radially from the axis of the shield 2 terminate at or near the limiting surface of the direct light ray cone defined by the lens 4. With this construction those random reflected rays which would pass forward through the lens 4 at a considerable angle to the axis of the reflector are intercepted, while other random reflected rays more nearly parallel to the reflected light beam are not intercepted. The interception of only the wide angle random reflected rays materially reduces objectionable glare, and may be satisfactory particularly in cases where the source of light is not strong.

It will be seen that a construction is provided wherein the direct light rays, except for a small portion thereof directed downwardly on to the roadway, are shielded from the eyes of an observer approaching the lamp, and that the random reflected rays passing outwardly through the lens are materially reduced, but all without any substantial interference with the reflected parallel light beam. This invention provides a lamp in which objectionable glare is materially reduced or eliminated.

The foregoing description of an embodiment of the invention is illustrative merely and is not intended as defining the limits of the invention.

I claim:

1. In a headlamp, in combination, a reflector, a source of light, a lens, a three leaved ruled surface shield, with ruled elements substantially parallel to the axis of the reflector, and with the three leaves symmetrically placed at angles of approximately 120 degrees and extending backward from the lens toward the light source and joined by ruled surfaces.

2. In a headlamp, in combination, a reflector, a source of light, a lens, a three leaved ruled surface shield, with ruled elements substantially parallel to the axis of the reflector, and with the three leaves symmetrically placed at angles of approximately 120 degrees and joined by ruled surfaces in which the lower joined ruled surface has a downward opening.

3. In a headlamp, in combination, a reflector, a source of light, a lens, a three leaved ruled surface shield, with ruled elements substantially parallel to the axis of the reflector and with the three leaves symmetrically placed at angles of approximately 120 degrees and joined by ruled surfaces and having one leaf in a vertical plane.

4. In a headlamp, in combination, a reflector, a source of light, a lens, a three leaved ruled surface shield, with ruled elements substantially parallel to the axis of the reflector and with the three leaves symmetrically placed at angles of approximately 120 degrees and extending from the lens toward the light source and joined by ruled surfaces and with a closure element forward and between the two lower leaves to partially intercept direct forward light rays.

LAURENCE I. HEWES.